(12) United States Patent
Schlude

(10) Patent No.: US 7,255,324 B2
(45) Date of Patent: Aug. 14, 2007

(54) QUARTER-TURN DIAPHRAGM VALVE

(75) Inventor: Richard D. Schlude, York, PA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 269 days.

(21) Appl. No.: 11/069,438

(22) Filed: Mar. 1, 2005

(65) Prior Publication Data

US 2006/0197050 A1    Sep. 7, 2006

(51) Int. Cl.
  *F16K 7/00*    (2006.01)
(52) U.S. Cl. .................. 251/93; 251/251; 251/331
(58) Field of Classification Search ............. 251/331, 251/251, 92–93, 90
  See application file for complete search history.

(56) References Cited

U.S. PATENT DOCUMENTS

| | | | |
|---|---|---|---|
| 2,227,914 A * | 1/1941 | Saunders | 251/331 |
| 3,040,594 A | 6/1962 | Bagshaw | |
| 4,667,931 A | 5/1987 | Egert et al. | |
| 4,682,755 A | 7/1987 | Bernstein et al. | |
| 4,700,735 A | 10/1987 | Hamernik et al. | |
| 4,729,544 A | 3/1988 | Baumann | |
| 4,807,664 A | 2/1989 | Wilson et al. | |
| 5,108,069 A | 4/1992 | Tada et al. | |
| 5,284,319 A | 2/1994 | Baumann | |
| 5,342,024 A | 8/1994 | Kim | |
| 5,413,311 A | 5/1995 | Arstein et al. | |
| 5,449,144 A * | 9/1995 | Kowalics | 251/331 |
| 5,653,419 A | 8/1997 | Uchisawa et al. | |
| 5,899,437 A | 5/1999 | Quarre | |
| 6,007,047 A | 12/1999 | Phipps | |
| 6,047,953 A * | 4/2000 | Jacob, Jr. | 251/331 |
| 6,079,442 A | 6/2000 | Raymond, Jr. et al. | |
| 6,176,254 B1 | 1/2001 | Choi | |
| 6,206,029 B1 | 3/2001 | Onodera | |
| 6,343,615 B1 | 2/2002 | Miller et al. | |
| 6,505,657 B1 | 1/2003 | Lawrence | |
| 6,543,747 B2 | 4/2003 | Buchwald et al. | |
| 2003/0094156 A1 | 5/2003 | Kondo | |
| 2003/0107021 A1 | 6/2003 | Saurwein et al. | |
| 2003/0116731 A1 | 6/2003 | Hartley | |

FOREIGN PATENT DOCUMENTS

| | | |
|---|---|---|
| DE | 814 302 C | 9/1951 |
| FR | 1 358 478 A | 4/1964 |
| GB | 536 209 A | 5/1941 |
| GB | 885 149 A | 12/1961 |
| GB | 1 593 356 A | 7/1981 |

* cited by examiner

Primary Examiner—John Bastianelli
(74) Attorney, Agent, or Firm—RatnerPrestia

(57) ABSTRACT

A quarter-turn valve includes a valve body having an inlet, an outlet, and a diaphragm adjacent arranged in said valve body for movement between a closed and opened position for restricting and controlling fluid flow. The valve further includes an input shaft for receiving a torsional input load in a closing direction and a torsional input load in an opposite opening direction. A cam is mounted on the input shaft. The cam transforms input loads to linear output loads that flex the diaphragm between its closed and opened positions.

10 Claims, 5 Drawing Sheets

QUARTER-TURN DIAPHRAGM VALVE

BACKGROUND OF THE INVENTION

Ball valves may be used in a variety of applications. However, ball valves are difficult to clean. More specifically, a ball valve typically must be removed from the system in which it is installed, disassembled, hand-cleaned, and reassembled. The multi-step process of removal, disassembly, cleaning, reassembly, and reinstallation of a ball valve is prohibitively time-consuming, and also requires inventory of ball valve components.

Conventional diaphragm valves, although usually easier to clean than ball valves, are often multi-turn valves. In other words, typically an operator must manually turn a handle, handwheel, or other such rotatable component through several revolutions to operate a conventional diaphragm valve between its closed and opened positions. Such an operational requirement is prohibitively time-consuming, cumbersome, and access to the diaphragm valve may be obstructed by the configuration of the system in which it is installed.

Accordingly, there remains a need for a simplified, easy-to-clean, quick-operating valve.

SUMMARY OF THE INVENTION

A diaphragm valve includes a valve body having an inlet, an outlet, and a diaphragm arranged in the valve body for movement between a closed and opened position for restricting and controlling fluid flow. The valve further includes an input shaft for receiving a torsional input load in a closing direction and a torsional input load in an opposite opening direction. A cam is mounted on the input shaft. The cam transforms the input loads to linear output loads that flex the diaphragm between its closed and opened positions.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

Figure 1:
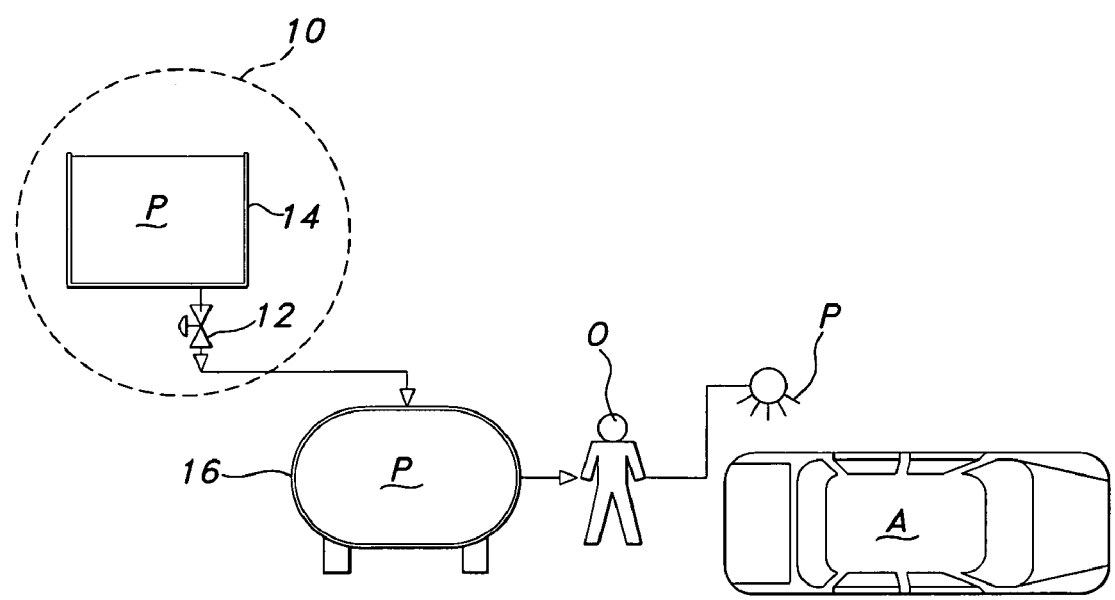
FIG. 1 is a schematic representation of an application in which a quarter-turn valve in accordance with the present invention may be utilized.

FIG. 1 is a schematic representation of one application (i.e., a paint tote system 10) in which a valve 12 in accordance with the present invention may be utilized. More specifically, paint manufacturers deliver large volumes of paint to end users through the use of reusable paint totes 14, also referred to as tote tanks. These totes 14 hold both clear and colored paint P to be used, for example, by the automotive industry.

In the exemplary application, tote 14 is filled with paint P at a paint manufacturing facility, and shipped to an automotive plant. Valve 12, also referred to as tote valve 12, is opened to permit discharge of paint P from tote tank 14 to a storage tank 16 at the automotive plant. When tote 14 becomes empty, it is shipped to a tote cleaning facility, and then sent back to the paint manufacturing facility to be refilled with paint P so that the above-described process can be repeated. In the meantime, paint P in storage tank 16 may be applied by an operator O, or a robot, to an automobile A.

Figure 2:
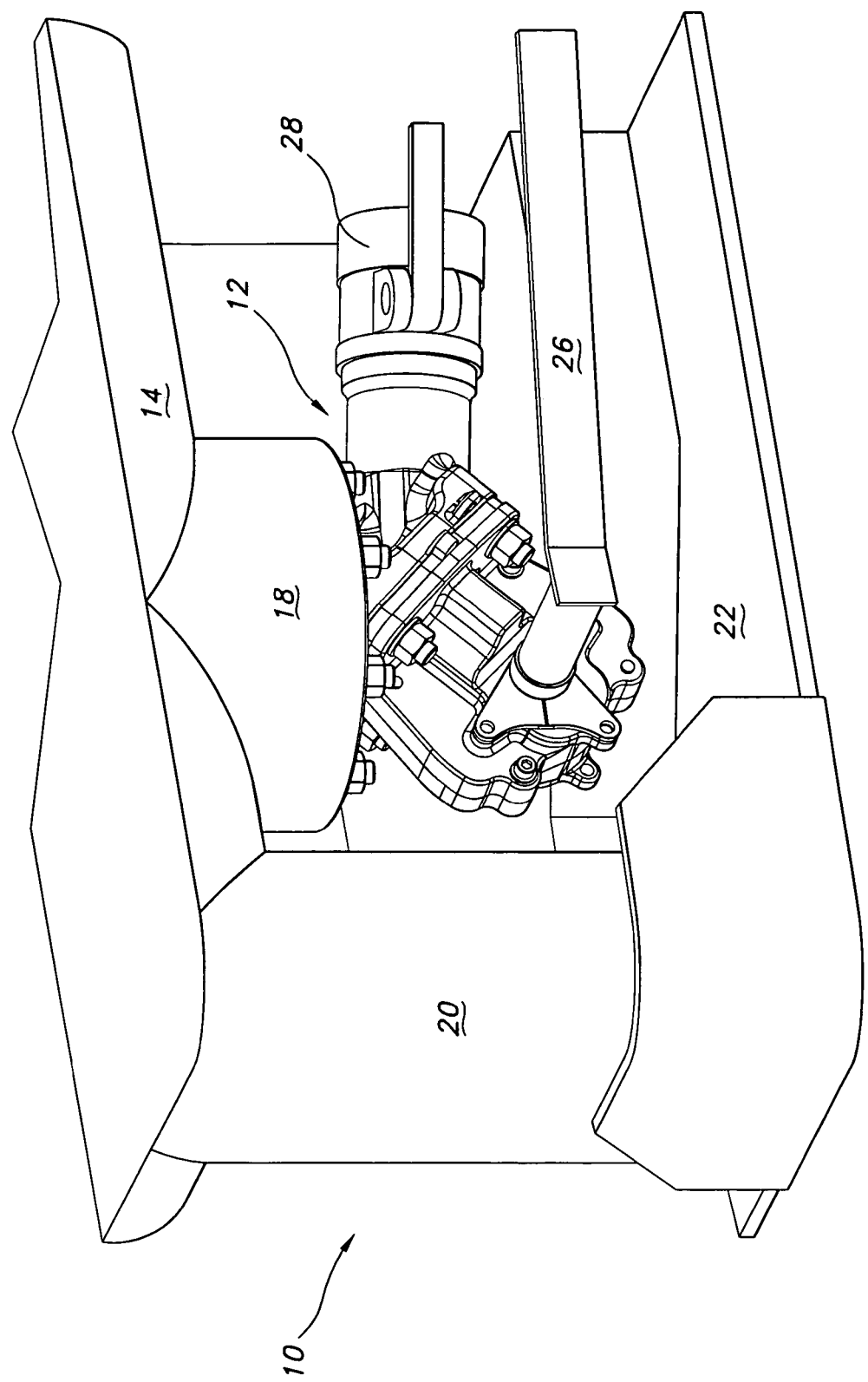
FIG. 2 is a perspective view of a valve in accordance with the present invention, showing one application thereof with a tote tank.

FIG. 2 illustrates valve 12 within a paint tote system 10, showing its relation to a cutaway view of the tote tank 14 schematically represented in FIG. 1. Tote tank 14 typically includes an outlet 18 and at least three support legs 20. As illustrated in FIG. 2, legs 20 rest on a base 22. Alternatively, legs 20 may rest directly on a surface such as, for example, a floor, a truck bed, a platform, or any other surface suitable for supporting tote tank 14. Valve 12 is mounted on the bottom of tote tank 14. More specifically, valve 12 is connected to outlet 18 for controlling flow from tote tank 14. Valve 12 is located inboard of the footprint of tote tank 14 to prevent damage during transport. This feature also permits stacking.

Valve 12 includes an input shaft 24 (shown in FIGS. 3A, 3B, and 4) rotatable through about 90°, and a flexible diaphragm 26 (shown in FIGS. 3B and 4) operatively connected to input shaft 24 by a cam 28 (shown in FIGS. 3A, 3B, and 4) for movement between a valve open and a valve closed position when input shaft 24 is rotated from one position to another position spaced about 90° therefrom. The angle of rotation of input shaft 24 is not limited to about 90°, and may be less than or slightly greater than 90°. A handle 26 is attached to an end of input shaft 24 to facilitate rotation of input shaft 24. Valve 12 is shown in its closed position in FIG. 2. In use, generally, a hose is connected to a nozzle portion 28 of valve 12. Handle 26 is rotated about 90° (in a counterclockwise direction with respect to the orientation of FIG. 2) to open valve 12 to permit the flow of paint P from tote tank 14. The operation of valve 12 will be explained in greater detail below.

Figure 3A:
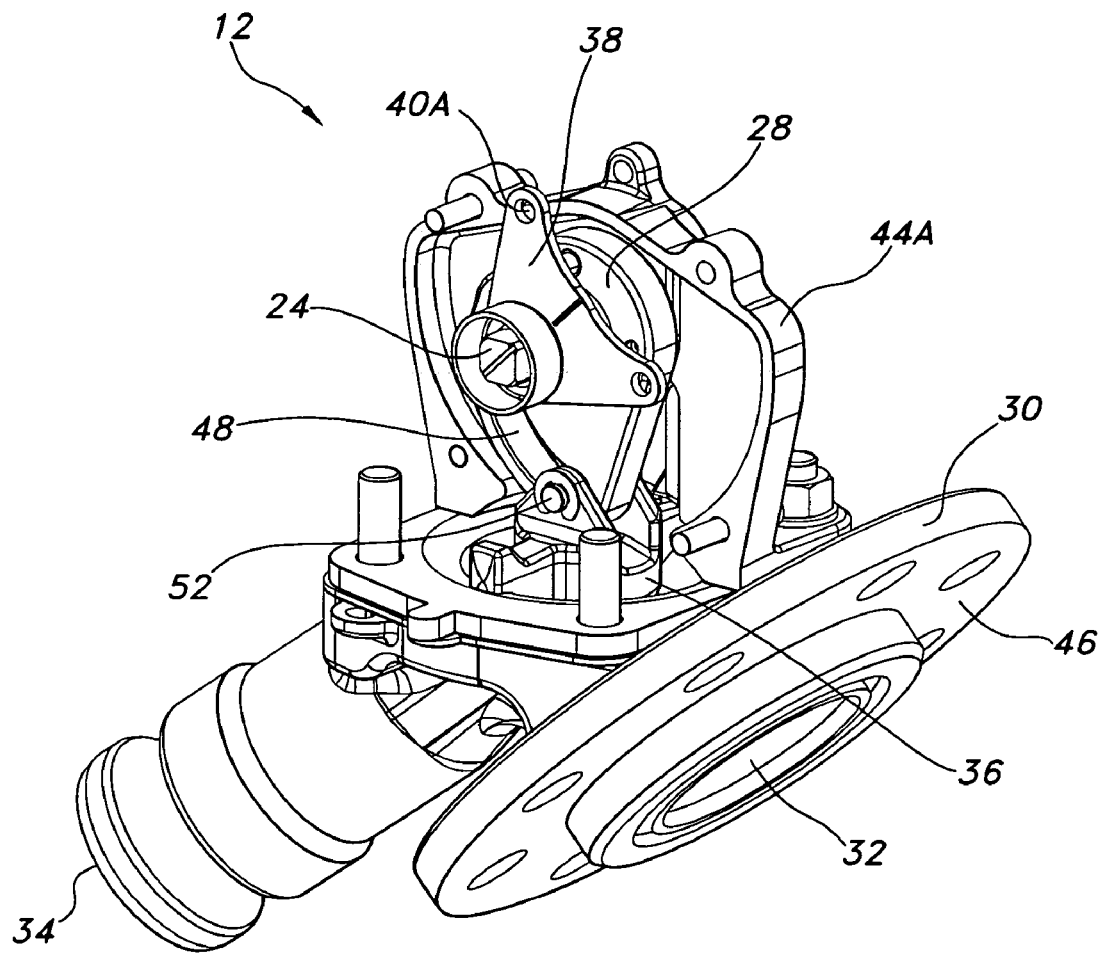
FIG. 3A is a partial cut-away perspective view of the valve illustrated in FIG. 2 showing the valve in a closed position.
Figure 3B:
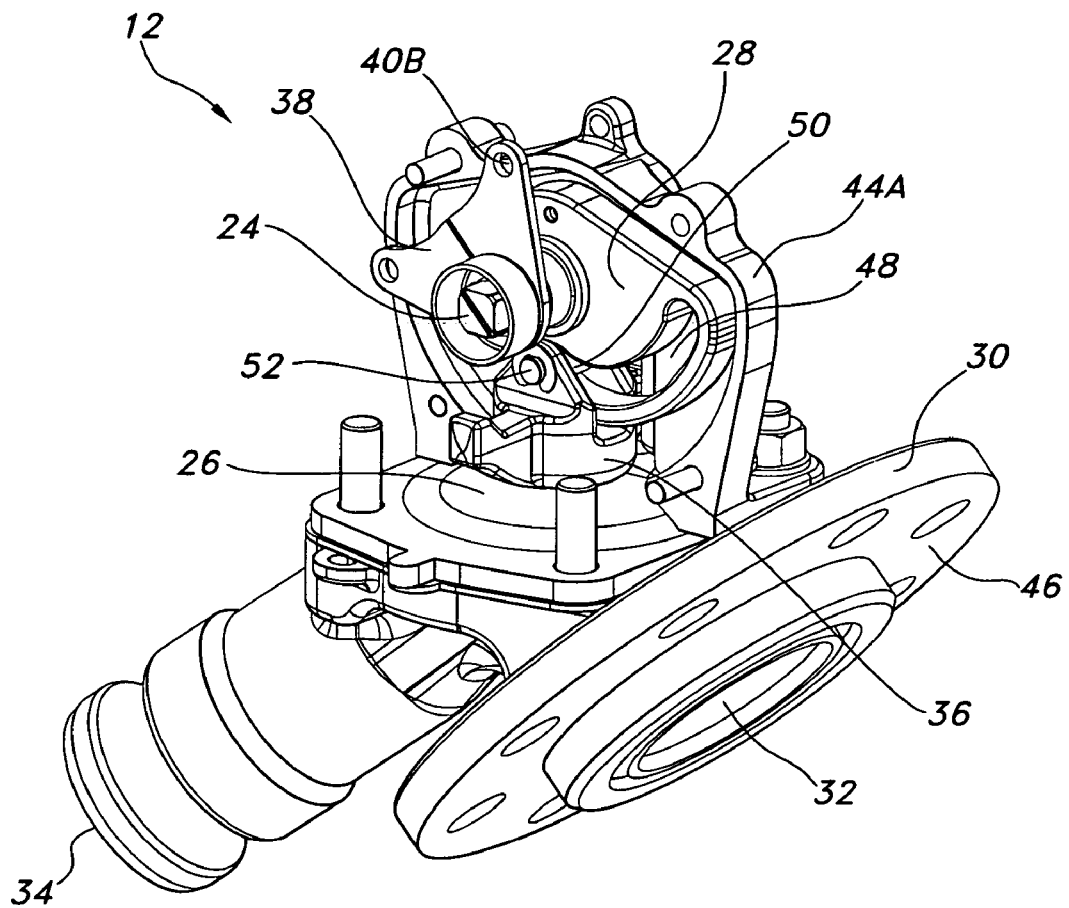
FIG. 3B is a partial cut-away perspective view similar to that of FIG. 3A, showing the valve in an open position.

FIGS. 3A and 3B are partial cut-away perspective views of valve 12 showing valve 12 in its closed and open positions, respectively. In these views, valve 12 is rotated in a clockwise direction with respect to the orientation of FIG. 2 for clarity purposes. A general description of exemplary components of valve 12 is provided herein with reference to FIGS. 3A and 3B. Details of various valve component interrelationships will be explained below with reference to FIG. 4.

Figure 4:
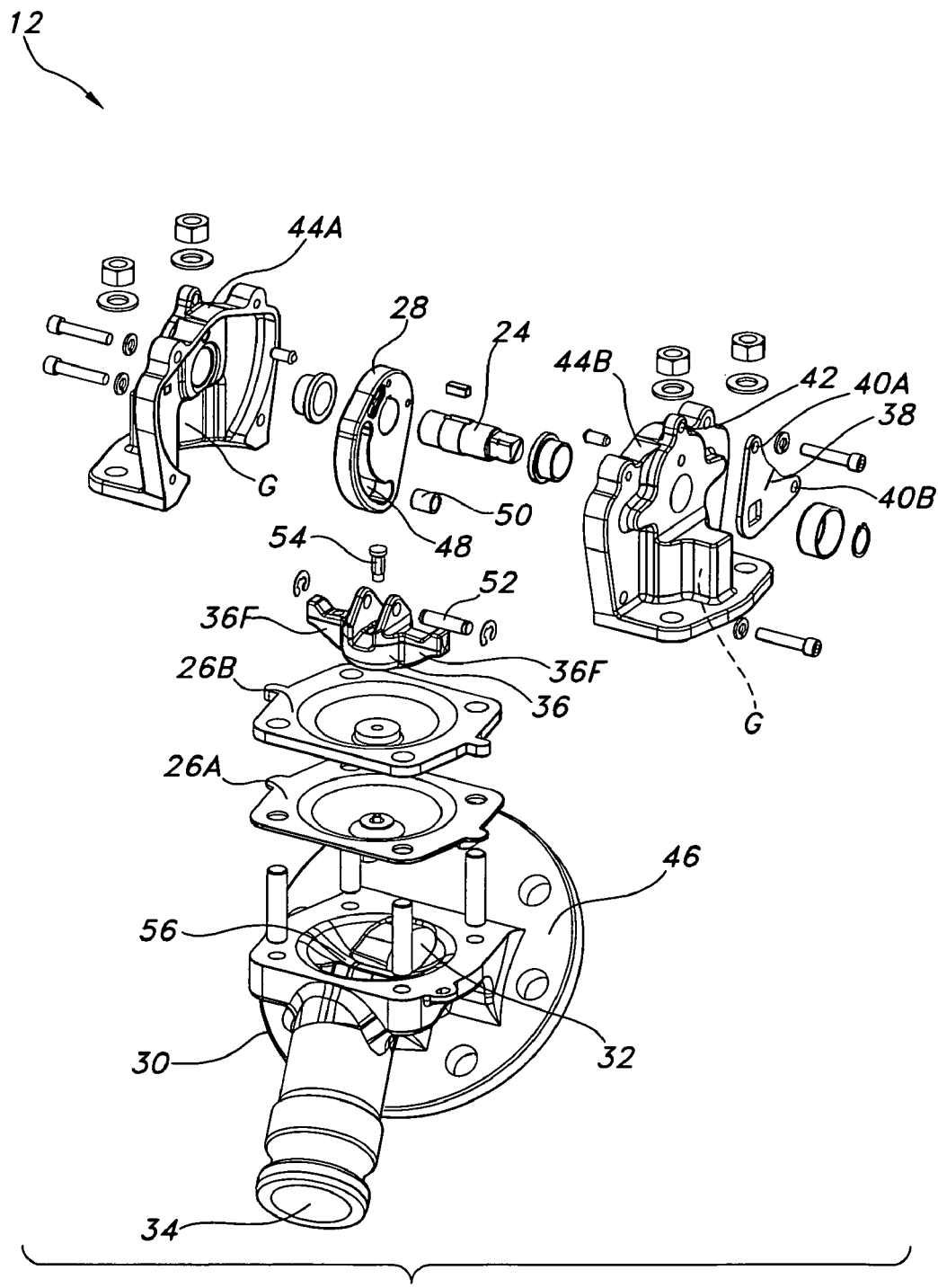
FIG. 4 is an exploded view of the valve illustrated in FIG. 2.

As illustrated in FIGS. 3A (closed position) and 3B (open position), valve 12 includes a valve body 30 having an inlet 32, an outlet 34, and a weir 56 (an internal feature represented more clearly in FIG. 4). Diaphragm 26 (shown in FIGS. 3B and 4) is mounted adjacent weir 56 for movement between a closed and opened position for restricting and permitting flow to outlet 34. Input shaft 24 receives a torsional input load in a closing direction and a torsional input load in an opposite opening direction from handle 26 (shown in FIG. 2), as explained above with reference to FIG. 2. Cam 28 is mounted on input shaft 24 to transform the closing direction torsional input load to a closing direction linear output load that flexes diaphragm 26 against weir 56 to close valve 12 (as in FIG. 3A), and to transform the opening direction torsional input load to an opposite opening direction linear output load to flex diaphragm 26 away from weir 56 to open valve 12 (as in FIG. 3B).

A compressor 36 having fingers 36F is positioned between cam 28 and diaphragm 26. More specifically, compressor 36 is slidably connected to cam 28, and fixedly connected to diaphragm 26. Compressor 36 pushes diaphragm 26 against weir 56 to close valve 12 (as in FIG. 3A), and pulls diaphragm 26 away from weir 56 to open valve 12 (as in FIG. 3B).

Bonnet halves 44A and 44B encase the majority of the components of valve 12 as represented in FIG. 4. Each bonnet half 44A, 44B includes a groove G for guiding fingers 36F of compressor 36. Bonnet half 44 has been cut away for clarity purposes in FIGS. 3A and 3B.

A lock plate 38 is mounted on input shaft 24, and is configured to lock valve 12 in a closed position when input shaft 24 is rotated to the closed position (as in FIG. 3A), and to lock valve 12 in an opened position when input shaft 24 is rotated to the open position (as in FIG. 3B). Lock plate 38 includes through holes 40A and 40B to facilitate the locking feature. More specifically, when valve 12 is in its closed position (as in FIG. 3A), a tie-wrap, pin, or other suitable securing device (not shown) may be threaded through hole 40A and a hole 42 of bonnet half 44B (shown in FIG. 4). (Bonnet half 44B has been cut away for clarity purposes in FIGS. 3A and 3B.) Such a configuration locks valve 12 in its closed position by preventing rotation of input shaft 24. Similarly, when valve 12 is in its open position (as in FIG. 3B), a tie-wrap, pin, or other suitable securing device (not shown) may be threaded through hole 40B and a hole 42 of a bonnet half 44 (shown in FIG. 4). Such a configuration locks valve 12 in its open position by preventing rotation of input shaft 24. It is contemplated that the securing device is easy to remove when unlocking valve 12 is desired.

Valve 12 further includes a mounting flange 46 proximal to inlet 32 for mounting valve 12 on the bottom of tote tank 14, as illustrated in FIG. 2.

Referring now to the exploded view of FIG. 4, details of various valve component interrelationships will be explained. In this view, similar to FIGS. 3A and 3B, valve 12 is rotated with respect to the orientation of FIG. 2 for clarity purposes.

Handle 26 (shown in FIG. 2) is attached to an end of input shaft 24 to facilitate rotation of input shaft 24. Cam 28 is a plate rotatably mounted on input shaft 24. Cam 28 has a slot 48 with a bushing sleeve 50 slidably positioned therein. Bushing sleeve 50 is rotatably mounted on a roller pin 52 connected to compressor 36. Compressor 36 is fixedly connected to diaphragm 26 via a tube nut 54.

Diaphragm 26 includes a diaphragm 26A and a backing cushion 26B. Diaphragm 26A is made from a plastic or elastomer material such as, for example, polytetrafluoroethylene (PTFE), ethylene-propylene-diene terpolymer (EPDM), etc.

In use, valve 12 may be in the closed position, as illustrated in FIG. 3A. In the closed position, diaphragm 26 is pushed against weir 56, to create a seal. To open valve 12, an opening direction torsional input load is applied to handle 26 (shown in FIG. 2) by rotating handle 26 about 90° (in a counterclockwise direction with respect to the orientation of FIG. 2). Rotation of handle 26 facilitates rotation of input shaft 24, which in turn facilitates rotation of cam 28. As cam 28 rotates from the position illustrated in FIG. 3A to the position illustrated in FIG. 3B, bushing sleeve 50 (rotatably mounted on roller pin 52) travels along slot 48. Because roller pin 52 is connected to compressor 36, the compressor travels in a linear fashion as illustrated from FIG. 3A to FIG. 3B. Rotational movement of compressor 36 is constrained by fingers 36F guided within grooves G of bonnet halves 44A, 44B. Because compressor 36 is fixedly connected to diaphragm 26 via a tube nut 54, compressor 36 pulls diaphragm 26 away from weir 56 to open valve 12. In other words, cam 28 transforms the opening direction torsional input load to an opening direction linear output load to flex diaphragm 26 away from weir 56 to open valve 12.

To close valve 12 from the open position (as illustrated in FIG. 3B) to a closed position (as illustrated in FIG. 3A), the process described above is reversed. More specifically, to close valve 12, a closing direction torsional input load is applied to handle 26 by rotating handle 26 about 90° in a counterclockwise direction to the position illustrated in FIG. 2. Rotation of handle 26 facilitates rotation of input shaft 24, which in turn facilitates rotation of cam 28. As cam 28 rotates from the position illustrated in FIG. 3B to the position illustrated in FIG. 3A, bushing sleeve 50 (rotatably mounted on roller pin 52) travels along slot 48. Because roller pin 52 is connected to compressor 36, compressor travels in a linear fashion as illustrated from FIG. 3B to FIG. 3A. Because compressor 36 is fixedly connected to diaphragm 26 via a tube nut 54, compressor 36 pushes diaphragm 26 against weir 56 to close valve 12. In other words, cam 28 transforms the closing direction torsional input load to a closing direction linear output load to flex diaphragm 26 against weir 56 to close valve 12.

Valve 12 of the present invention may be cleaned in place, i.e., it does not require removal from the system in which it is installed for cleaning purposes. When tote tank 14 becomes empty, it can be power-washed with water, steam, and/or a weak solvent. Valve 12 is typically opened all the way and a steam wand is inserted into outlet 34 to clean valve 12.

Valve 12 does not require disassembly, hand-cleaning, nor reassembly, which reduces the likelihood of damage to the components.

These advantageous features save valuable time and increase the number of paint tote systems 10 that can be cleaned per day. Furthermore, paint tote systems 10 utilizing the valve 12 of this invention can be used for both clear and colored paint products. These features, in turn, reduce the size of a particular paint tote system fleet due to the quicker recycle time and multi-paint functions.

Alternatively, valve 12 of the present invention may be utilized with a tote tank 14 that includes a liner. The versatility of valve 12 eliminates the need to dedicate individual tote tanks 14 for use with or without a liner. This feature simplifies the logistics of managing a particular paint tote system fleet.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A quarter-turn valve comprising:
   a valve body having an inlet, an outlet and a weir there between;
   a diaphragm arranged in said valve body for movement between a closed and opened position whereby said diaphragm cooperates with said weir for closing and opening said outlet;

an input shaft for receiving a torsional input load in a closing direction and a torsional input load in an opposite opening direction; and a cam mounted on said input shaft for rotation therewith and a compressor fixed to said diaphragm, said cam comprising a plate formed with an arcuate surface having a length of about 90°, a bushing carried by said compressor and cooperating with said arcuate surface for transforming said input loads to linear output loads that flex said diaphragm between its closed and opened positions said cam having an arcuate slot formed in said plate; and wherein said bushing is slidably positioned in said slot, and is rotatably mounted to said compressor.

2. The valve of claim 1, wherein said compressor pushes said diaphragm to close said valve, and pulls said diaphragm to open said valve.

3. The valve of claim 1 further comprising a lock plate mounted on said input shaft, said lock plate configured to lock said valve in a closed position when said input shaft is rotated to said closed position, and to lock said valve in an opened position when said input shaft is rotated to said open position.

4. The valve of claim 1, wherein said valve body comprises a mounting flange proximal to said inlet.

5. The valve of claim 1 further comprising a handle attached to an end of said input shaft, said handle adapted to facilitate rotation of said input shaft.

6. A quarter-turn valve comprising:
a valve body having an inlet, an outlet and a weir therebetween;
a diaphragm arranged in said valve body for movement between a closed and opened position whereby said diaphragm cooperates with said weir for closing and opening said outlet;
an input shaft rotatable between a closing position and an opening position spaced about 90° from said closing position; and
a cam having an arcuate surface, said cam being mounted on said input shaft, for rotation therewith, and a compressor fixed to said diaphragm, said arcuate surface and said compressor being operatively arranged to move said diaphragm between its open and closed positions when said cam rotates through about 90° said cam having a plate rotatably mounted on said input shaft, said plate formed with an arcuate slot having a length of about 90°; and wherein a bushing sleeve is slidably positioned in said slot, said bushing sleeve being rotatably mounted on a roller pin connected to said compressor.

7. The valve of claim 6, wherein said compressor pushes said diaphragm to close said valve, and pulls said diaphragm to open said valve.

8. The valve of claim 6 further comprising a lock plate mounted on said input shaft, said lock plate configured to lock said valve in a closed position when said input shaft is rotated to said closing position, and to lock said valve in an opened position when said input shaft is rotated to said opening position.

9. The valve of claim 6, wherein said valve body comprises a mounting flange proximal to said inlet.

10. The valve of claim 6 further comprising a handle attached to an end of said input shaft, said handle adapted to facilitate rotation of said input shaft.

\* \* \* \* \*